United States Patent
Lee

(10) Patent No.: US 9,557,769 B2
(45) Date of Patent: Jan. 31, 2017

(54) MOBILE TERMINAL

(71) Applicant: LG ELECTRONICS INC., Seoul (KR)

(72) Inventor: Woohun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 435 days.

(21) Appl. No.: 14/028,226

(22) Filed: Sep. 16, 2013

(65) Prior Publication Data

US 2014/0125911 A1 May 8, 2014

(30) Foreign Application Priority Data

Nov. 5, 2012 (KR) .................. 10-2012-0124374

(51) Int. Cl.
- *G02F 1/1333* (2006.01)
- *G06F 1/16* (2006.01)
- *G02F 1/1335* (2006.01)
- *H04M 1/02* (2006.01)
- *H04M 1/18* (2006.01)

(52) U.S. Cl.
CPC ....... *G06F 1/1637* (2013.01); *G02F 1/133308* (2013.01); *G02F 1/133608* (2013.01); *H04M 1/0266* (2013.01); *H04M 1/185* (2013.01); *H04M 2250/22* (2013.01)

(58) Field of Classification Search
CPC .................. G02F 1/133308; G02F 1/133608
See application file for complete search history.

(56) References Cited

U.S. PATENT DOCUMENTS

| | | |
|---|---|---|
| 2009/0247236 A1 | 10/2009 | Kajiwara et al. |
| 2011/0053653 A1 | 3/2011 | Tho et al. |
| 2011/0222220 A1* | 9/2011 | Murakata ............. G06F 1/1601 361/679.01 |
| 2012/0081865 A1 | 4/2012 | Chang |
| 2012/0106201 A1 | 5/2012 | Choi et al. |
| 2012/0170244 A1 | 7/2012 | Kwon et al. |
| 2013/0242226 A1* | 9/2013 | Jeong ................... G06F 1/1637 349/58 |

\* cited by examiner

*Primary Examiner* — Phu Vu
(74) *Attorney, Agent, or Firm* — Birch, Stewart, Kolasch & Birch, LLP

(57) ABSTRACT

A mobile terminal is provided. The mobile terminal includes a display module mounted to a terminal body, and having a window coupled thereto; a fixing unit configured to couple the window and the display module to each other; and a case covering one side surface of the display module, and forming an appearance of the terminal body, wherein the fixing unit extends from one point between the window and the display module, to a side surface of the display module, such that the display module is coupled to the case.

5 Claims, 9 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0124374, filed on Nov. 5, 2012, the contents of which is incorporated by reference herein in its entirety.

BACKGROUND OF THE DISCLOSURE

Field of the Invention

The present disclosure relates to a mobile terminal, and more particularly, to a coupling structure between a display and a terminal body.

Description of Related Art

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

Recently, a display is provided on a front surface of the mobile terminal for a simpler appearance and a more convenient user interface. Especially, as a multimedia function of the mobile terminal is considered to be important, a mobile terminal capable of displaying a larger screen on the same area has been spotlighted. Accordingly, a structure of a mobile terminal capable of minimizing an area of a bezel portion on a display may be considered.

SUMMARY OF THE DISCLOSURE

Therefore, an aspect of the detailed description is to provide a mobile terminal capable of having a bezel portion of a narrow width, as a display coupling structure differentiated from the conventional art.

To achieve these and other advantages and in accordance with the purpose of this specification, as embodied and broadly described herein, there is provided a mobile terminal, comprising: a display module mounted to a terminal body, and having a window coupled thereto; a fixing unit configured to couple the window and the display module to each other; and a case covering one side surface of the display module, and forming an appearance of the terminal body, wherein the fixing unit extends from one point between the window and the display module, to a side surface of the display module, such that the display module is coupled to the case.

According to an embodiment of the present invention, the terminal body may be provided with a mounting portion recessed from one surface thereof such that the display module is mounted therein.

According to an embodiment of the present invention, the case may form one side surface of the mounting portion, and the fixing unit may be configured to couple the display module to said one side surface of the mounting portion.

According to an embodiment of the present invention, a touch sensing portion may be formed on a rear surface of the window.

According to an embodiment of the present invention, the fixing unit may extend from an upper surface of the display module to a lower surface of the display module.

According to an embodiment of the present invention, the fixing unit may be implemented as an adhesive layer is formed on two surfaces of a middle member formed of synthetic resin.

According to an embodiment of the present invention, the fixing unit may comprise a first fixing portion configured to couple the window and the display module with each other, and a second fixing portion configured to couple the display module and the case with each other.

According to an embodiment of the present invention, a buffer configured to elastically support the window, may be formed on an upper surface of the first fixing portion.

According to an embodiment of the present invention, the first fixing portion may comprise a buffering member having two surfaces onto which an adhesive has been applied.

According to another aspect of the present invention, there is provided a mobile terminal, comprising: a terminal body; a display module mounted to the terminal body, and having a window coupled thereto; and a fixing unit comprised of a first fixing portion for coupling the display module and the window with each other, and a second fixing portion for coupling the terminal body and the display module with each other.

According to an embodiment of the present invention, the fixing unit may extend up to a side surface of the display module, from one point between the display module and the window, in a state where the terminal body, the window and the display module have been integrally coupled to each other.

According to an embodiment of the present invention, the second fixing portion may further extend up to a lower surface of the display module.

According to an embodiment of the present invention, the terminal body may be provided with a mounting portion recessed from one surface thereof such that the display module is mounted therein.

According to an embodiment of the present invention, the case which forms an appearance of the terminal body may form one side surface of the mounting portion, and the fixing unit may be configured to couple the display module to said one side surface of the mounting portion.

According to an embodiment of the present invention, a buffer configured to elastically support the window, may be formed on an upper surface of the first fixing portion.

According to an embodiment of the present invention, the first fixing portion may comprise a buffering member having two surfaces onto which an adhesive has been applied.

The mobile terminal according to the present invention may have the following advantages.

Firstly, the mobile terminal can have a sufficient coupling force without using a coupling means such as screws, and can minimize an area of a bezel portion.

Further, the area of the bezel portion of the mobile terminal can be prevented from increasing, even if a coupling means is used.

This can provide a display having a screen size increased by a contracted bezel area, and can implement a mobile terminal having a narrow bezel portion.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal of the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
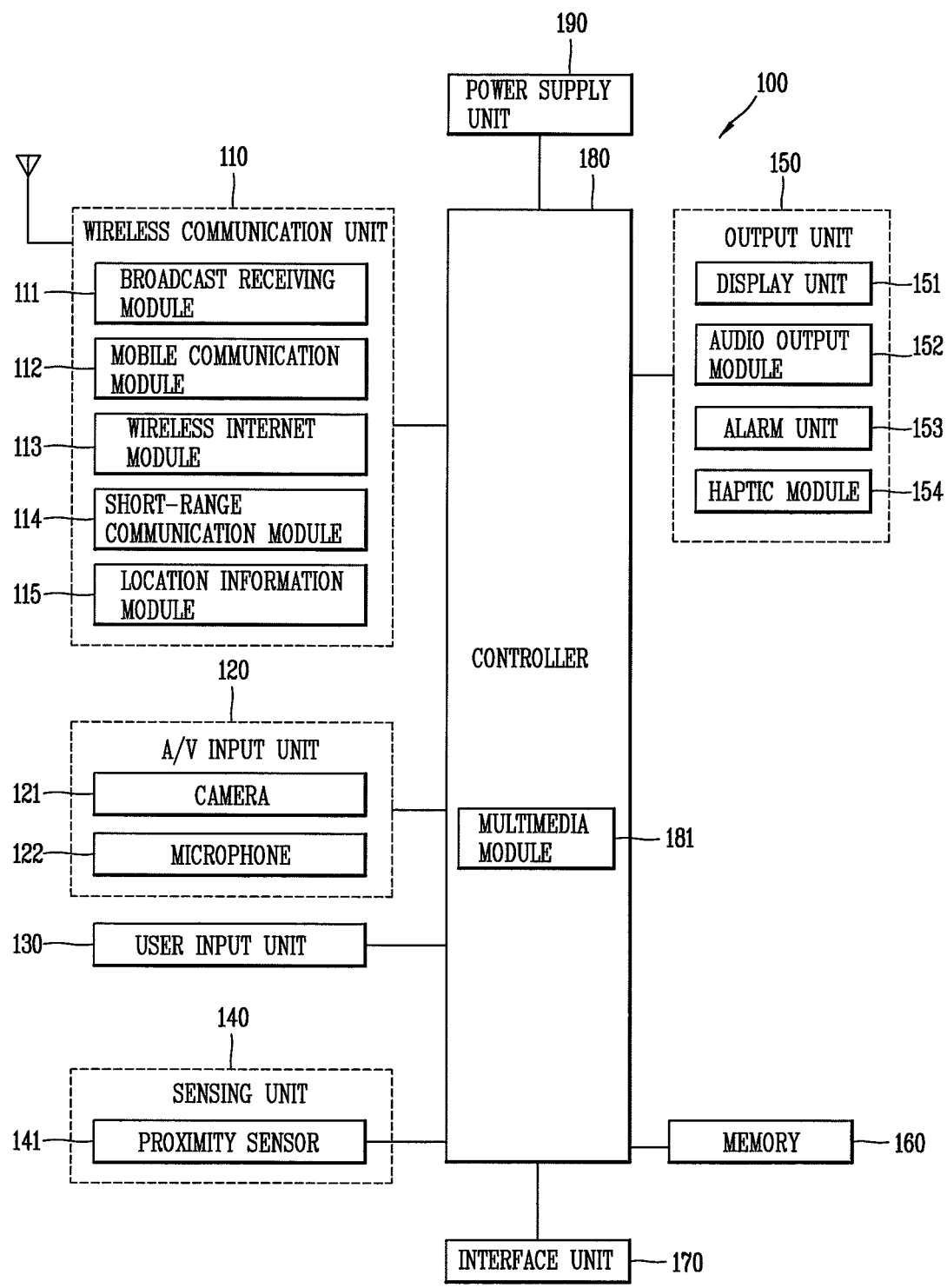
FIG. 1 is a block diagram of a mobile terminal according to an embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 denotes a module for sensing or calculating a position of a mobile terminal. An example of the location information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
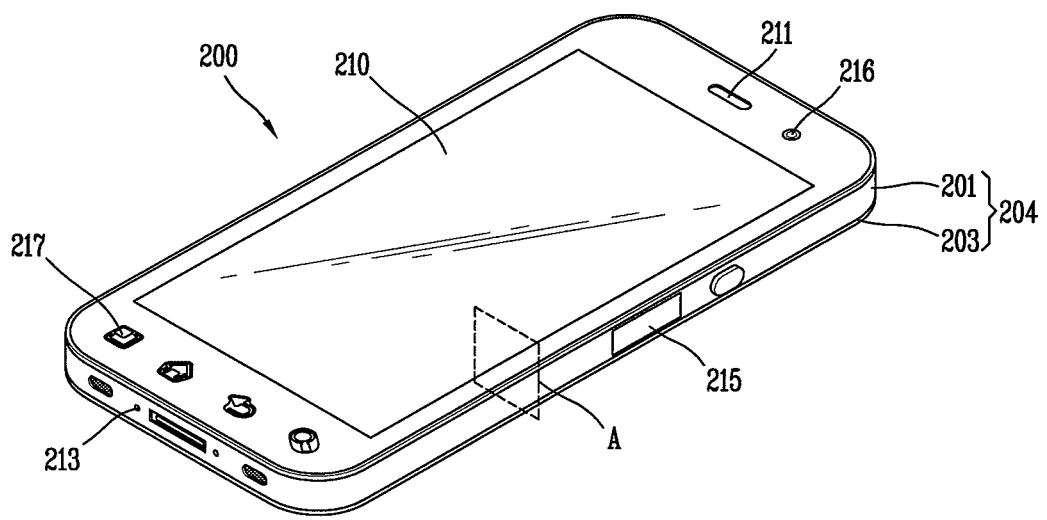
FIG. 2 is a front perspective view of a mobile terminal according to an embodiment of the present invention.
Figure 3:
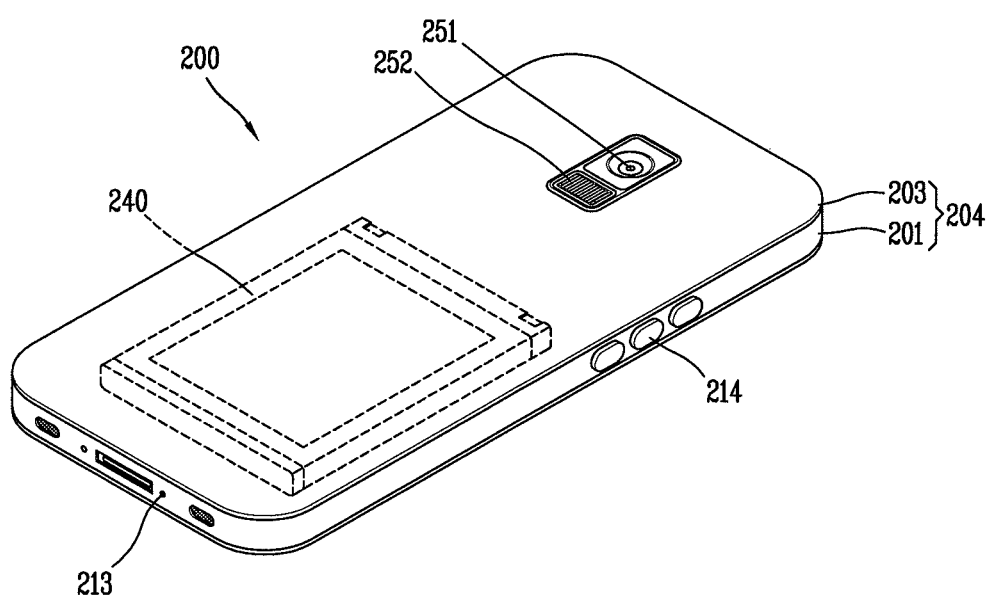
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body 204. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202 (refer to FIG. 5), and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a signal input unit 217.

The display unit 210 includes a liquid crystal display (LCD) module, organic light emitting diodes (OLED) module, e-paper, etc., each for visually displaying information. The display unit 210 may include a touch sensing means for inputting information in a touch manner. Hereinafter, the display unit 210 including the touch sensing means is called a 'touch screen'. Once a part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner Content input by the side key 214 may be variously set. For instance, through the side key 214, may be input commands such as controlling the front and rear cameras 216 and 251, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 251 are disposed on the rear surface of the body 204.

A flash 252 and a mirror (not shown) may be disposed close to the rear camera 251. When capturing an object by using the rear camera 251, the flash 252 provides light onto the object.

When the user captures an image of himself/herself by using the rear camera 251, a mirror can be used for the user to look at himself/herself therein.

The rear camera 251 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 251 may operate with a relatively higher pixels (higher resolution) such that it can be useful for a user to obtain higher quality pictures for later use. The front camera 216 and the rear camera 251 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
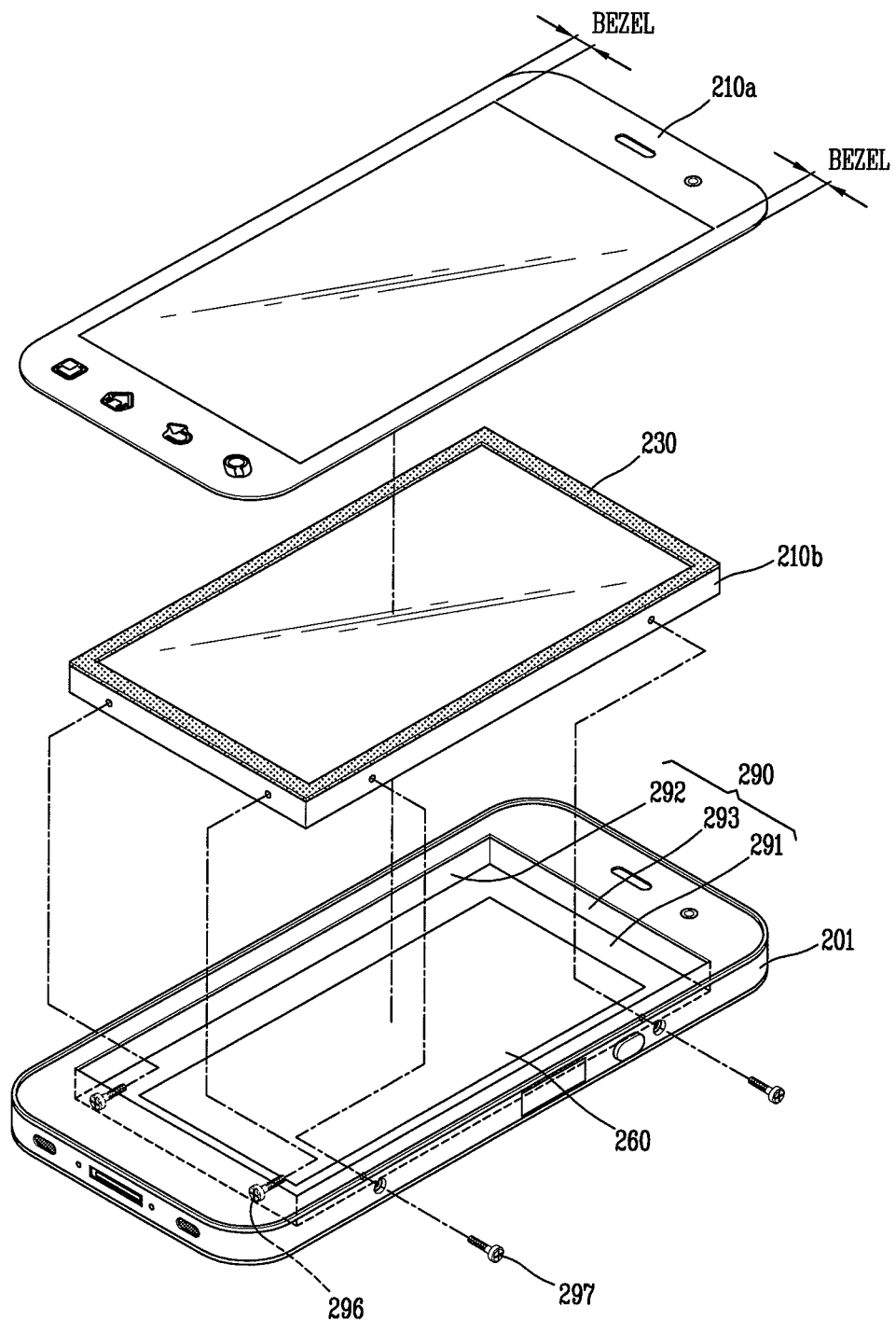
FIGS. 4 and 5 are exploded perspective views of the mobile terminal of FIGS. 2 and 3, respectively.
Figure 5:
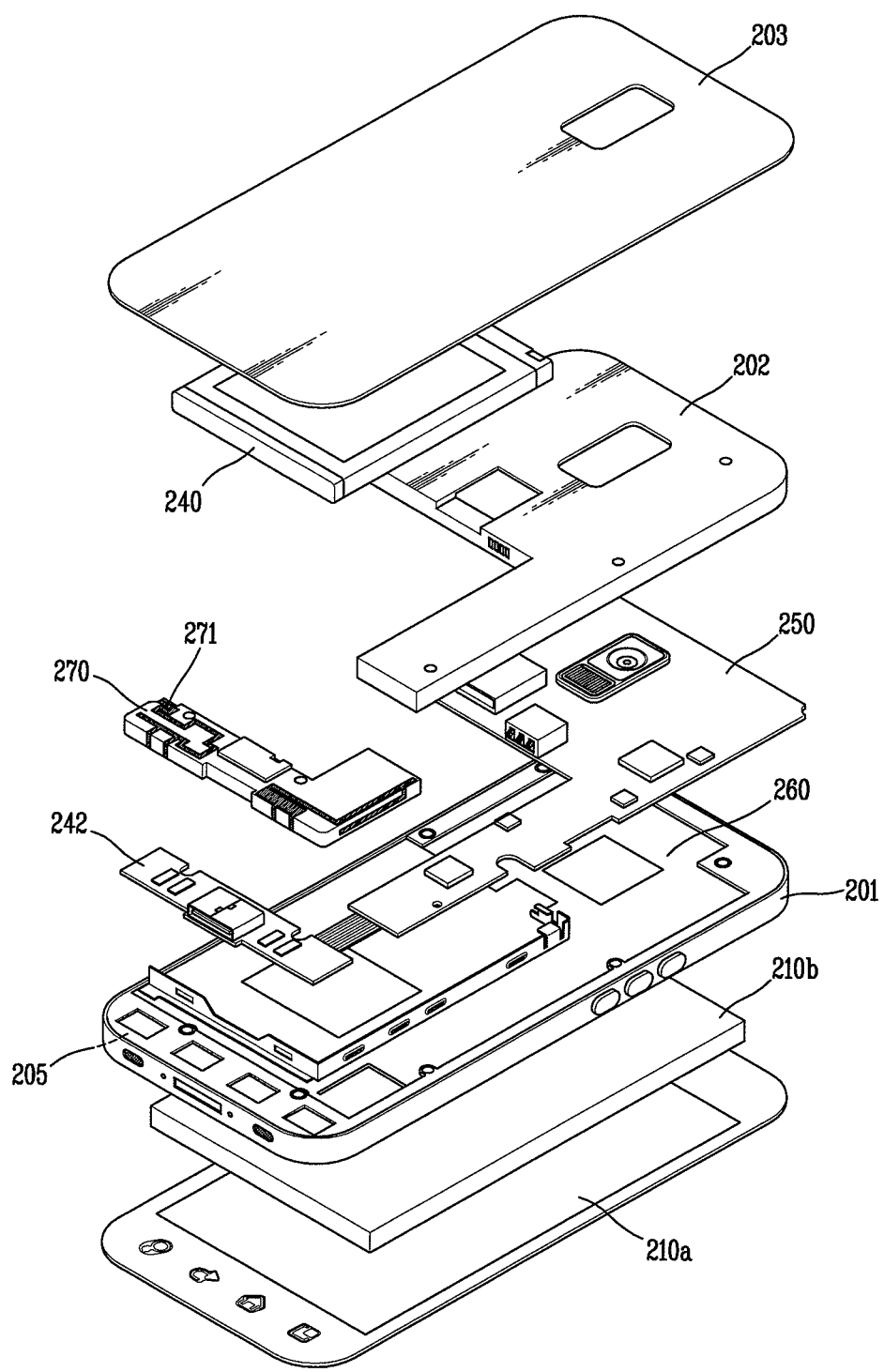

FIG. 4 is an exploded perspective view of the mobile terminal of FIG. 2, which illustrates a coupling relation between the display unit and the terminal body. FIG. 5 is an exploded perspective view of the mobile terminal of FIG. 3, which illustrates a coupled state of various types of devices mounted to a rear surface of the mobile terminal.

Referring to FIGS. 4 and 5, the mobile terminal comprises a window 210*a* and a display module 210*b* which constitute the display unit 210. The window 210*a* may be coupled to one surface of the front case 201, or may be coupled to the display module. The window 210*a* and the display module 210*b* may be integrally formed with each other.

A touch sensing pattern 210*c* (refer to FIG. 6) configured to sense a touch input may be formed on one surface of the window 210*a*. A film provided with the touch sensing pattern 210*c* may be attached to a rear surface of the window 210*a*. The touch sensing pattern 210*c* is configured to sense a touch input, and is formed of a transmissive material. The touch sensing pattern is formed to cover most parts of the window 210*a*, and is configured to convert a voltage change, etc. occurring on a specific part of the window 210*a*, into an electrical input signal.

The display module 210*b* is mounted to the terminal body. The terminal body may be provided with a mounting portion 290 recessed from one surface thereof so that the display module 210*b* can be mounted therein. The mounting portion 290 is formed to have a size in correspondence to the display module 210*b*. Part of the terminal body which defines the mounting portion 290 may serve as a case which forms an appearance of the mobile terminal. That is, an inner side of the front case may serve as a side surface of the mounting portion 290.

In this embodiment, the display module 210*b* is implemented as a thin film transistor-liquid crystal display (TFT-LCD). However, the present invention is not limited to this.

For instance, the display module 210*b* may be implemented as a liquid crystal display (LCD), an organic light-emitting diode (OLED), a flexible display, a 3D display, etc.

Referring to FIG. 5, a frame 260 configured to support electronic devices is formed between the front case 201 and the rear case 202. The frame 260, which supports inside of the mobile terminal, may be configured to support at least one of the display module 210*b*, the camera module 251, the antenna device, the battery 240 and the circuit board 250.

Part of the frame 260 may be exposed to outside. The frame 260 may constitute part of a sliding module which connects a body part and a display part with each other, in a slide type mobile terminal rather than a bar type mobile terminal.

Referring to FIG. 5, the circuit board 250 is disposed between the frame 260 and the rear case 202, and the display module 210*b* is coupled to one surface of the frame 260. The circuit board 250 and the battery are disposed on another surface of the frame 260, and a battery case 203 for covering the battery may be coupled to the rear case 202.

As aforementioned, the circuit board 250 may be formed on one surface of the frame 260. However, the circuit board 250 may be mounted below the display module 210*b*. At least one electronic device is mounted on a lower surface of the circuit board 250.

A battery accommodation portion for accommodating the battery 240 is recessed from the frame 260. A contact terminal, connected to the circuit board 250 so as to supply power to the terminal body, may be formed on one side surface of the battery accommodation portion.

The antenna device may be formed on an upper end or a lower end of the mobile terminal. The antenna device may be formed in plurality, near the side surface of the mobile terminal. In this case, the respective antenna devices may be configured to transmit and receive (transceiver) radio signals in different frequency bands. Such antenna devices may comprise conductive patterns 271 formed on one surface of a carrier 270.

The frame 260 may be formed of a metallic material so as to have a sufficient strength even in a small thickness. The frame 260 formed of a metallic material may operate as a ground. That is, the circuit board 250 or the antenna device may be ground-connected to the frame 260, and the frame 260 may operate as a ground of the circuit board 250 or the antenna device. In this case, the frame 260 may extend a ground of the mobile terminal.

The circuit board 250 is electrically connected to the antenna device, and is configured to process radio signals (or radio electromagnetic waves) transmitted and received by the antenna device. For processing of radio signals, a plurality of transceiving circuits may be mounted to the circuit board 250.

The transceiving circuits may comprise one or more integrated circuits and related electric devices. As an example, the transceiving circuits may comprise a transmission integrated circuit, a reception integrated circuit, a switching circuit, an amplifier, etc.

As the plurality of transceiving circuits simultaneously feed conductive members formed in conductive patterns, a plurality of antenna devices may simultaneously operate. For instance, while one of the transceiving circuits performs signal transmission, another may perform signal reception. Alternatively, both of the transceiving circuits may perform signal transmission or signal reception.

A coaxial cable may be formed to connect the circuit board with each antenna device. For instance, the coaxial cable may be connected to feeding devices for feeding antenna devices. The feeding devices may be formed on one surface of a flexible printed circuit board (FPCB) 242 for processing signals input from the user input unit 217. Another surface of the FPCB may be coupled to a signal transmission unit for transmitting signals of the user input unit 217. In this case, a dome may be formed on another surface of the FPCB 242, and an actuator may be formed at the signal transmission unit.

Figure 6:
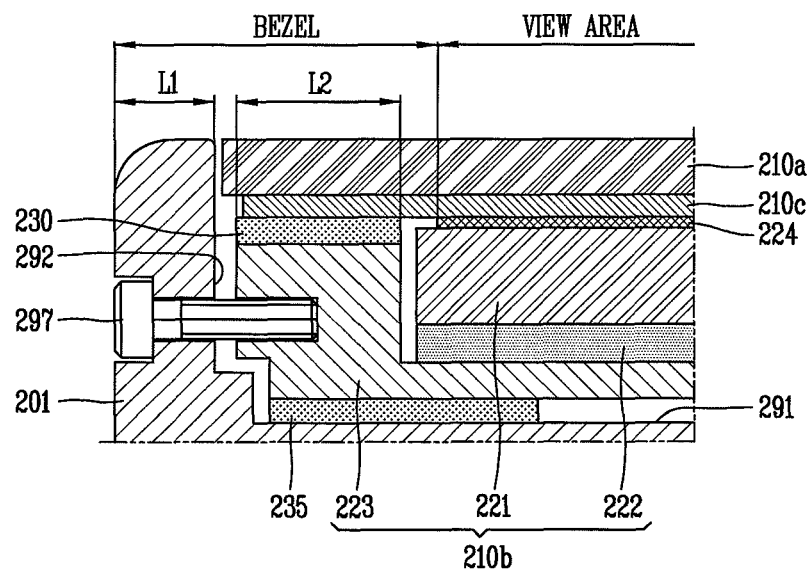
FIG. 6 is a sectional view of part 'A' of FIG. 2 according to a comparative embodiment of the present invention.
Figure 7:
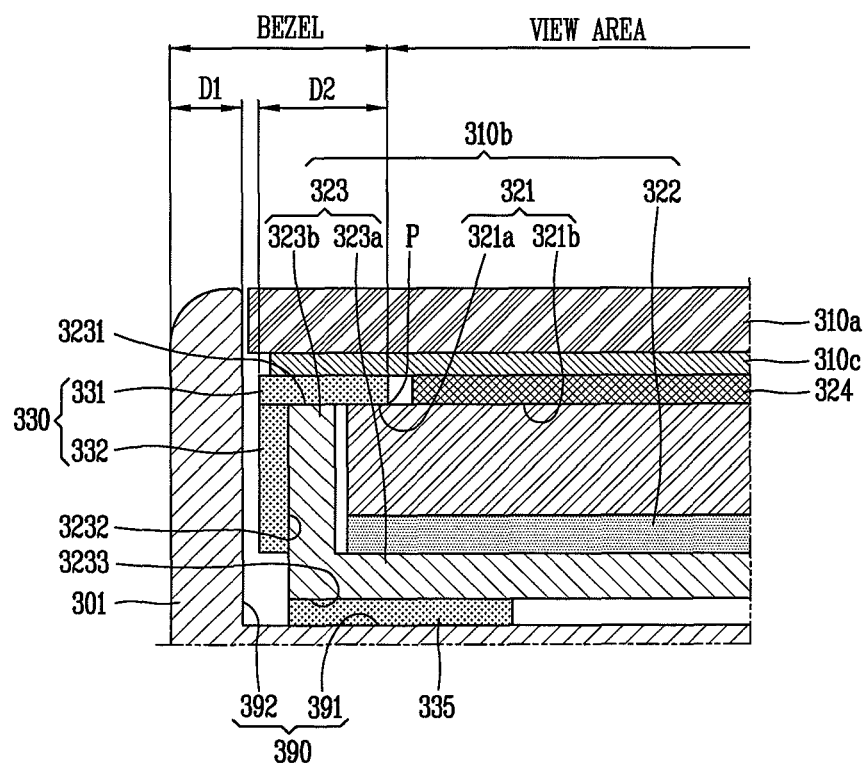
FIG. 7 is a sectional view of part 'A' of FIG. 2 according to an embodiment of the present invention.

FIG. 6 is a sectional view of part 'A' of FIG. 2 according to a comparative embodiment of the present invention, and FIG. 7 is a sectional view of part 'A' of FIG. 2 according to an embodiment of the present invention.

Referring to FIG. 6, the display module 210*b* is coupled to the mounting portion 290 recessed from the terminal body 204. The mounting portion 290 may be formed by the recessed main surface 291, and side surfaces 292 and 293. The main surface 291 of the mounting portion 290 may be coupled to a rear surface of the display module 210*b* in a facing manner. The mounting portion 290 and the display module 210*b* may be coupled to each other by an adhering means. As shown in FIG. 4, the mounting portion 290 and the display module 210*b* may be coupled to each other by a coupling means such as screws 296 and 297. Alternatively, the mounting portion 290 and the display module 210*b* may be coupled to each other not only by an adhering means, but also by a coupling means.

The display module 210*b* may comprise a housing 223 for covering an outer circumference of the display module 210*b*, a backlight unit 222 disposed in the housing 223, and an LCD module 221. The LCD module 221 may be formed as a TFT layer and a color filter layer are laminated between an upper polarizing plate and a lower polarizing plate.

Referring to FIG. 6 according to a comparative embodiment, a double-sided tape 235 is disposed between the main surface of the mounting portion 290 and the rear surface of the display module 210b. The main surface of the mounting portion 290 and the rear surface of the display module 210b are coupled to each other by an adhesive force of the double-sided tape 235. The window 210a and the LCD module 221 may be coupled to each other by a transparent adhering means 224 such as an optically clear adhesive (OCA) or an optically clear resin (OCR). An outer region of the window 210a is coupled to the housing 223 of the display module 210b by the double-sided tape 230.

The adhering means such as an OCA or an OCR has a low density because it is formed of a transparent material, thereby having a lower coupling force than a double-sided tape. In order to more stably couple the window 210a to the LCD module 221, an edge of the window 210a is coupled to the housing 223 of the display module 210b by a double-sided tape.

Such double-sided tape should be arranged in a space having a width (L2) of at least 0.8 mm. When the mobile terminal is viewed from the front side, an outer periphery of the mobile terminal where no screen is displayed is called a 'bezel portion'. If the double-sided tape 230 is used like in the comparative embodiment, an area of a bezel portion increases by a mounting space of the double-sided tape.

In case of fixing the display module 210b to the mobile terminal like in the comparative embodiment, the mobile terminal and the display module 210b are coupled to each other by the double-sided tape disposed between a main surface of the mounting portion 290 and a rear surface of the display module 210b. This may lower a coupling force. In order to fix a side surface of the display module 210b to a side surface of the mounting portion 290, a coupling means such as screws should be used. In this case, the screw should be formed so that an insertion part thereof can have a thickness more than a prescribed thickness (L1). That is, in case of using screws, the case and the housing 223 of the display module 210b should be formed in thicknesses (L1 and L2) more than prescribed values. This may increase an area of a bezel portion of the mobile terminal.

In order to solve such problems, the present invention proposes a coupling structure between the display module 210b and the terminal body, capable of having a sufficient coupling force without using a coupling means such as screws, and capable of minimizing an area of a bezel portion. The present invention also provides a structure capable of preventing a bezel area from increasing when a coupling means is used.

Referring to FIG. 7, a rear surface of a display module 310b and a main surface 391 of a mounting portion 390 of the terminal body may be coupled to each other by an adhering means 335 such as a double-sided tape.

The display module 310b, a window 310a and a mounting portion 390 may be integrally coupled to each other by a fixing unit 330. More specifically, the fixing unit 330 extends to an edge of the display module 310b, from one point (P) between the display module 310b and the window 310a. Then, the fixing unit 330 is bent from the edge to thus extend up to a side surface of the display module 310b. By such fixing unit 330, the display module 310b, the window 310a and the mounting portion 390 may be integrally coupled to each other.

A side surface 392 of the mounting portion 390 and a side surface of the display module 310b are coupled to each other by the fixing unit 330. Since a coupling means such as screws is not used when the mounting portion 390 and the display module 310b are coupled to each other, a case 301 and the housing 323 may be formed to have small thicknesses.

The housing 323 may be provided with a first contact surface 3231 and a second contact surface 3232 each contacting the fixing unit 330 and a third contact surface 3233 contacting the adhering means 335. The first contact surface 3231 and the second contact surface 3232 may be formed on a side part 323b of the housing 323, and the third contact surface 3233 may be formed on a mounting portion 323a of the housing 323 where an LCD module 321 is mounted. The third contact surface 3233 may be formed to contact a backlight unit 322 formed below the LCD module 321.

In order to enhance a coupling force between the window 310a and the display module 310b, part of the fixing unit 330 may extend up to a point (P) between the window 310a and the LCD module 321, from an edge of the display module 310b. An adhering means such as an OCA or an OCR may be disposed between the window 310a and the LCD module 321. That is, an adhering means 324 is disposed between the window 310a and the LCD module 321 where the fixing unit 330 is not arranged, thereby coupling the window 310a and the LCD module 321 to each other.

Under such configuration, one surface of the LCD module 321 may be divided into a first region 321a covered by the fixing unit 330, and a second region 321b covered by the adhering means 324.

The fixing unit 330 may be formed on horizontal and vertical side surfaces of the display module 310b having a rectangular section. Alternatively, the fixing unit 330 may be formed only on the horizontal side surfaces, in a case where a bezel area cannot be reduced because the vertical side surfaces are influenced by neighboring mechanical parts. In this case, the vertical side surfaces of the display module 310b may be coupled to the terminal body by a coupling means such as screws.

Figure 8A:
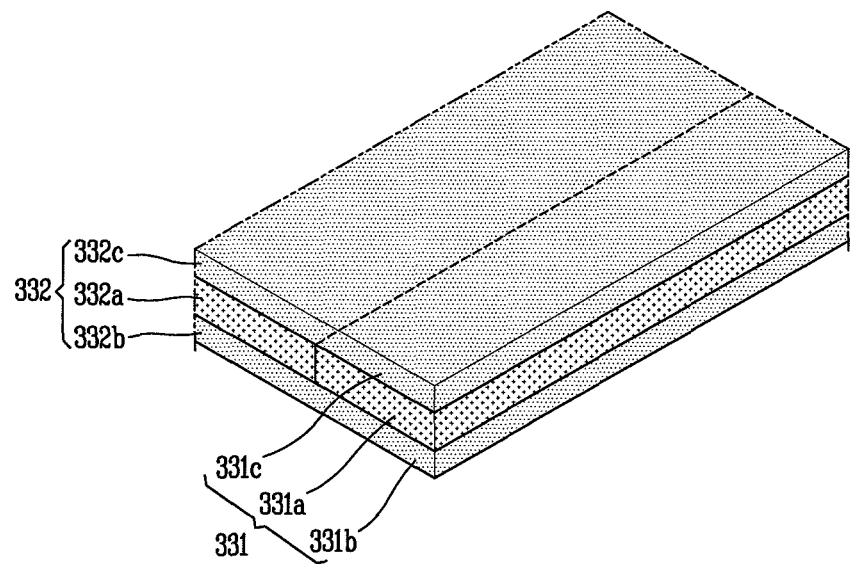
FIGS. 8A and 8B are perspective views showing part of a fixing unit according to the present invention.
Figure 8B:
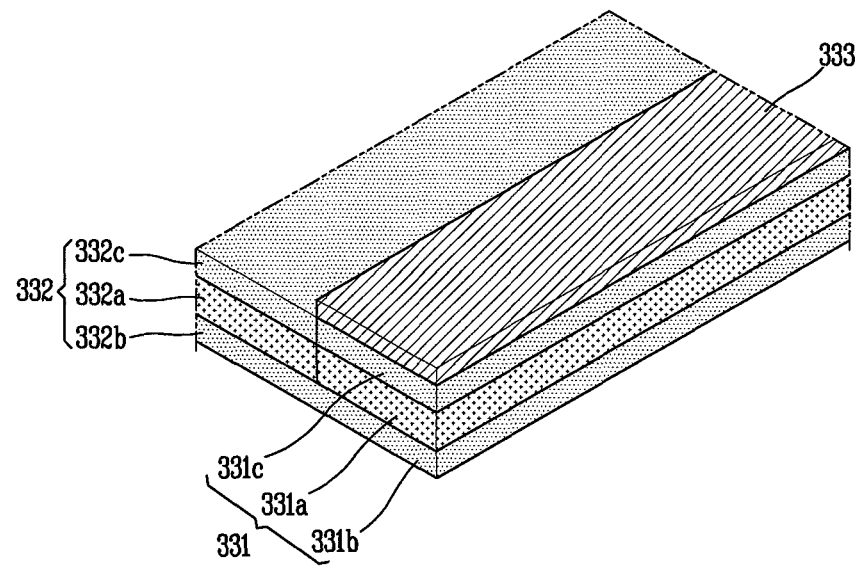

FIGS. 8A and 8B are perspective views showing part of the fixing unit 330 according to the present invention.

The fixing unit 330 may comprise a first fixing portion 331 and a second fixing portion 332. The first fixing portion 331 and the second fixing portion 332 may be integrally formed with each other, and may be partitioned from each other in a bending manner when the fixing unit 330 is coupled to the display module 310b. The first fixing portion 331 and the second fixing portion 332 may be formed of the same material or different materials.

The display module 310b, the window 310a and the mounting portion 390 may be integrally coupled to each other by the fixing unit 330. In this case, the first fixing portion 331 is configured to couple the display module 310b and the window 310a to each other, while the second fixing portion 332 is configured to couple the display module 310b and the mounting portion 390 to each other.

The fixing unit 330 may be implemented as adhesive layers 331b and 331c are formed on two surfaces of a middle member 331a, and adhesive layers 332b and 332c are formed on two surfaces of a middle member 332a. The middle members 331a and 332a may be formed of synthetic resin such as PET or polyurethane. The adhesive layers 331b, 331c, 332b and 332c may be formed of resin such as acryl.

The middle member may be implemented as a buffering member. The buffering member may be formed of an elastic material such as polyurethane. If the fixing unit 330 comprises a buffering member, an impact applied to the display module 310b or the window 310a can be attenuated.

The first fixing portion 331 disposed between the window 310a and the display module 310b may comprise a buffering member. Alternatively, the fixing portion 331 and a buffer 333 may be integrally formed with each other as the buffer 333 is formed on an upper surface of the first fixing portion 331.

The first fixing portion 331 may be configured to prevent dust particles from being introduced into a space between the window 310a and the display module 310b.

Figure 9A:
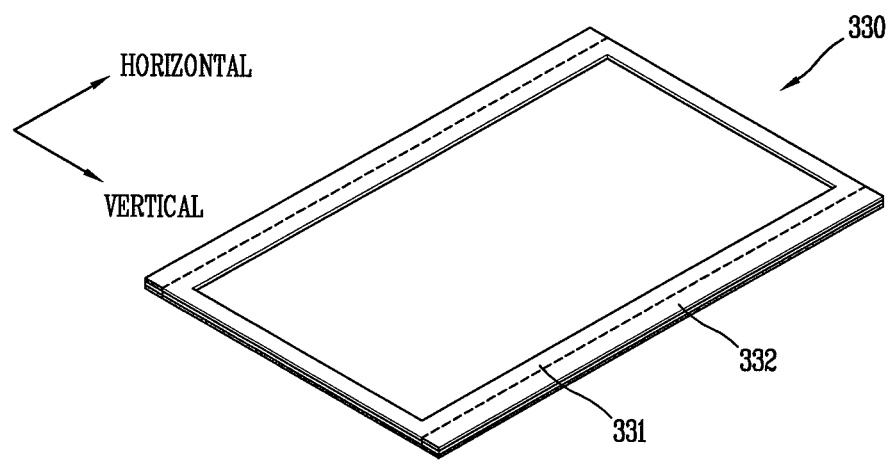
FIG. 9A is a perspective view of a fixing unit according to the present invention.
Figure 9B:
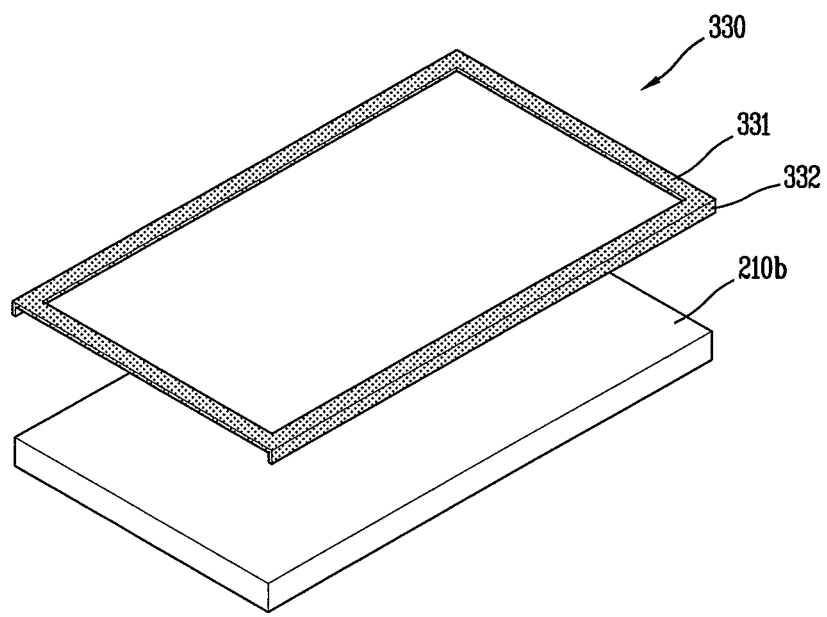
FIG. 9B is a conceptual view showing an example of a fixing unit coupled to a display module.

FIG. 9A is a perspective view of the fixing unit 330 according to the present invention, and FIG. 9B is a conceptual view showing an example of the fixing unit 330 coupled to the display module 310b.

As shown in FIG. 9A, the fixing unit 330 may be configured to cover an edge of the display module 310b of a rectangular shape. The first fixing portion 331 of the fixing unit 330 may be firstly coupled to the display module 310b, and then the second fixing portion 332 may be coupled to a side surface of the display module 310b.

As shown in FIG. 9B, the second fixing portion 332 may be formed to be coupled to only horizontal side surfaces of the display module 310b. More specifically, the first fixing portion 331 may be formed to cover all edges of one surface of the display module 310b, whereas the second fixing portion 332 may be formed to cover only two side surfaces of the display module 310b.

Figure 10:
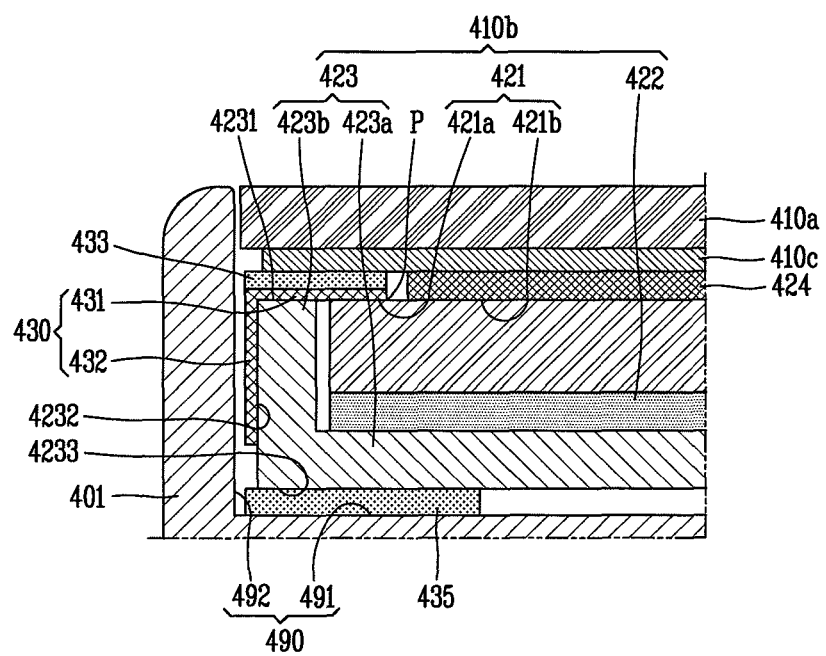
FIGS. 10 to 12 are sectional views of part 'A' of FIG. 2 according to other embodiments of the present invention.

FIG. 10 is a sectional view of part 'A' of FIG. 2 according to another embodiment of the present invention.

Referring to FIG. 10, a rear surface of a display module 410b may be coupled to a main surface 491 of a mounting portion 490 of the terminal body, by an adhering means 435 such as a double-sided tape.

The display module 410b, the window 410a and the mounting portion 490 may be integrally coupled to each other by a fixing unit 430. More specifically, the fixing unit 430 extends to an edge of the display module 410b, from one point (P) between the display module 410b and the window 410a. Then, the fixing unit 430 is bent from the edge to thus extend up to a side surface of the display module 410b. By such fixing unit 430, the display module 410b, the window 410a and the mounting portion 490 may be integrally coupled to each other.

A side surface 492 of the mounting portion 490 and a side surface of the display module 410b are coupled to each other by the fixing unit 430. As a coupling means such as screws is not used when the mounting portion 490 and the display module 410b are coupled to each other, a case 401 and the housing 423 may be formed to have small thicknesses.

The housing 423 may be provided with a first contact surface 4231 and a second contact surface 4232 each contacting the fixing unit 430 and a third contact surface 4233 contacting the adhering means 435. The first contact surface 4231 and the second contact surface 4232 may be formed on a side part 423b of the housing 423, and the third contact surface 4233 may be formed on a mounting portion 423a of the housing 423 where an LCD module 421 is mounted. The third contact surface 4233 may be formed to contact a backlight unit 422 formed below the LCD module 421.

In order to enhance a coupling force between the window 410a and the display module 410b, part of the fixing unit 430 may extend up to a point (P) between the window 410a and the LCD module 421, from an edge of the display module 410b. An adhering means such as an OCA or an OCR may be disposed between the window 410a and the LCD module 421. That is, an adhering means 424 is disposed between the window 410a and the LCD module 421 where the fixing unit 430 is not arranged, thereby coupling the window 410a and the LCD module 421 to each other.

Under such configuration, one surface of the LCD module 421 may be divided into a first region 421a covered by the fixing unit 430, and a second region 421b covered by the adhering means 424.

The fixing unit 430 may comprise a first fixing portion 431 and a second fixing portion 432. The first fixing portion 431 and the second fixing portion 432 may be integrally formed with each other, and may be partitioned from each other in a bending manner when the fixing unit 430 is coupled to the display module 410b. The first fixing portion 431 and the second fixing portion 432 may be formed of the same material or different materials.

The display module 410b, the window 410a and the mounting portion 490 may be integrally coupled to each other by the fixing unit 430. In this case, the first fixing portion 431 is configured to couple the display module 410b and the window 410a to each other, while the second fixing portion 432 is configured to couple the display module 410b and the mounting portion 490 to each other.

A buffer 433 may be formed on an upper surface of the first fixing portion 431, and the first fixing portion 431 and the buffer may be integrally formed with each other. The buffer may serve to attenuate an impact applied to the display module 410b or the window 410a, and may prevent dust particles from being introduced into a space between the display module 410b and the window 410a.

Figure 11:
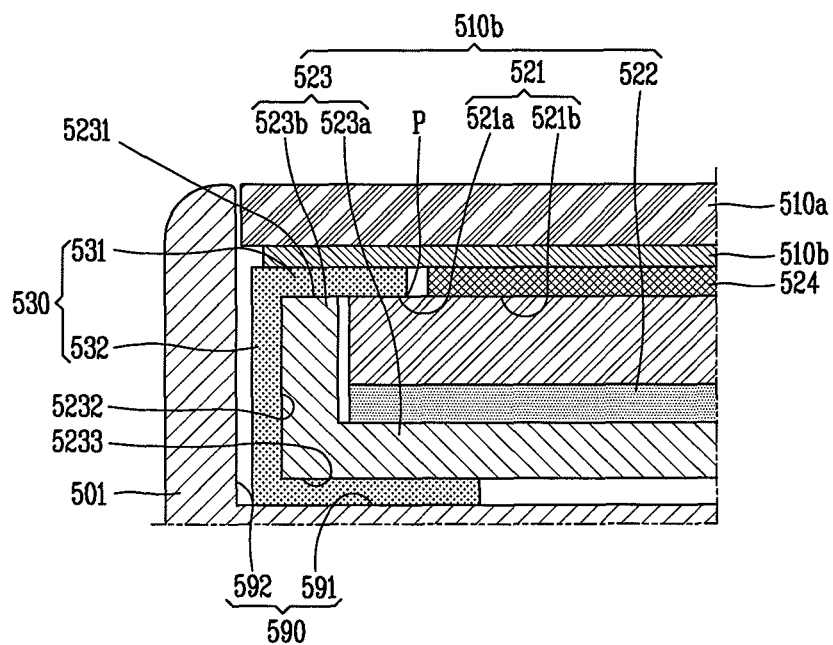

FIG. 11 is a sectional view of part 'A' of FIG. 2 according to still another embodiment of the present invention.

Referring to FIG. 11, a display module 510b, a window 510a and a mounting portion 590 may be integrally coupled to each other by a fixing unit 530. More specifically, the fixing unit 530 extends to an edge of the display module 510b, from one point (P) between the display module 510b and the window 510a. Then, the fixing unit 530 is bent from the edge to thus extend up to a side surface of the display module 510b. By such fixing unit 530, the display module 510b, the window 510a and the mounting portion 590 may be integrally coupled to each other.

A side surface 592 of the mounting portion 590 and a side surface of the display module 510b are coupled to each other by the fixing unit 530. As a coupling means such as screws is not used when the mounting portion 590 and the display module 510b are coupled to each other, a case 501 and the housing 523 may be formed to have small thicknesses.

The housing 523 may be provided with a first contact surface 5231 and a second contact surface 5232 each contacting the fixing unit 530 and a third contact surface 5233 contacting an adhering means 535. The first contact surface 5231 and the second contact surface 5232 may be formed on a side part 523b of the housing 523, and the third contact surface 5233 may be formed on a mounting portion 523a of the housing 523 where an LCD module 521 is mounted. The third contact surface 5233 may be formed to contact a backlight unit 522 formed below the LCD module 521.

In order to enhance a coupling force between the window 510a and the display module 510b, part of the fixing unit 530 may extend up to a point (P) between the window 510a and the LCD module 521, from an edge of the display module 510b. An adhering means such as an OCA or an OCR may be disposed between the window 510a and the LCD module 521. That is, an adhering means 524 is disposed between the window 510a and the LCD module 521 where the fixing unit 530 is not arranged, thereby coupling the window 510a and the LCD module 521 to each other.

Under such configuration, one surface of the LCD module 521 may be divided into a first region 521a covered by the fixing unit 530, and a second region 521b covered by the adhering means 524.

The fixing unit 530 extends up to a lower surface of the display module 510b. The fixing unit 530 may comprise a first fixing portion 531 and a second fixing portion 532. The first fixing portion 531 and the second fixing portion 532 may be integrally formed with each other, and may be partitioned from each other in a bending manner when the fixing unit 530 is coupled to the display module 510b. The first fixing portion 531 and the second fixing portion 532 may be formed of the same material or different materials.

The display module 510b, the window 510a and the mounting portion 590 may be integrally coupled to each other by the fixing unit 530. In this case, the first fixing portion 531 is configured to couple the display module 510b and the window 510a to each other, while the second fixing portion 532 is configured to couple the display module 510b and the mounting portion 590 to each other. The second fixing portion 532 is formed to contact a side surface 592 and a main surface 591 of the mounting portion 590.

The fixing unit 530 may comprise a buffering member. The buffering member may serve to attenuate an impact applied to the display module 510b or the window 510a. The fixing unit 530 may prevent dust particles from being introduced into a space between the LCD module 521 and the window 510a.

Figure 12:
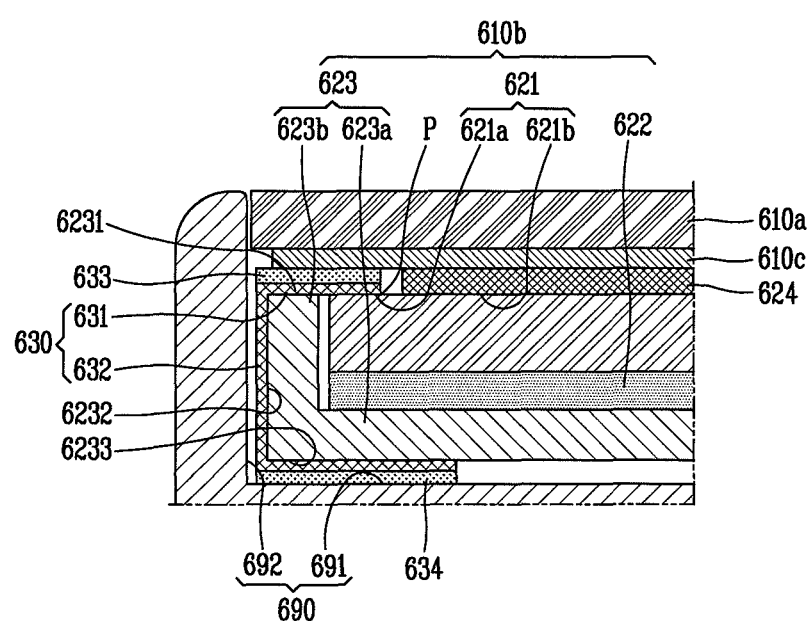

FIG. 12 is a sectional view of part 'A' of FIG. 2 according to yet still another embodiment of the present invention.

Referring to FIG. 12, a display module 610b, a window 610a and a mounting portion 690 may be integrally coupled to each other by a fixing unit 630. More specifically, the fixing unit 630 extends to an edge of the display module 610b, from one point (P) between the display module 610b and the window 610a. Then, the fixing unit 630 is bent from the edge to thus extend up to a side surface of the display module 610b. By such fixing unit 630, the display module 610b, the window 610a and the mounting portion 690 may be integrally coupled to each other.

A side surface 692 of the mounting portion 690 and a side surface of the display module 610b are coupled to each other by the fixing unit 630. As a coupling means such as screws is not used when the mounting portion 690 and the display module 610b are coupled to each other, a case 601 and the housing 623 may be formed to have small thicknesses.

The housing 623 may be provided with a first contact surface 6231 and a second contact surface 6232 each contacting the fixing unit 630 and a third contact surface 6233 contacting an adhering means 635. The first contact surface 6231 and the second contact surface 6232 may be formed on a side part 623b of the housing 623, and the third contact surface 6233 may be formed on a mounting portion 623a of the housing 623 where an LCD module 621 is mounted. The third contact surface 6233 may be formed to contact a backlight unit 622 formed below the LCD module 621.

In order to enhance a coupling force between the window 610a and the display module 610b, part of the fixing unit 630 may extend up to a point (P) between the window 610a and the LCD module 621, from an edge of the display module 610b. An adhering means such as an OCA or an OCR may be disposed between the window 610a and the LCD module 621. That is, an adhering means 624 is disposed between the window 610a and the LCD module 621 where the fixing unit 630 is not arranged, thereby coupling the window 610a and the LCD module 621 to each other.

Under such configuration, one surface of the LCD module 621 may be divided into a first region 621a covered by the fixing unit 630, and a second region 621b covered by the adhering means 624.

The fixing unit 630 extends up to a lower surface of the display module 610b. The fixing unit 630 may comprise a first fixing portion 631 and a second fixing portion 632. The first fixing portion 631 and the second fixing portion 632 may be integrally formed with each other, and may be partitioned from each other in a bending manner when the fixing unit 630 is coupled to the display module 610b. The first fixing portion 631 and the second fixing portion 632 may be formed of the same material or different materials.

The display module 610b, the window 610a and the mounting portion 690 may be integrally coupled to each other by the fixing unit 630. In this case, the first fixing portion 631 is configured to couple the display module 610b and the window 610a to each other, while the second fixing portion 632 is configured to couple the display module 610b and the mounting portion 690 to each other. The second fixing portion 632 is formed to contact a side surface 692 and a main surface 691 of the mounting portion 690.

A first buffer 633 is formed on an upper surface of the first fixing portion 631, and the first fixing portion 631 and the first buffer 633 may be integrally formed with each other. A second buffer 634 may be formed at a contact part between the second fixing portion 632 and the main surface 691 of the mounting portion 690. The second fixing portion 632 and the second buffer 634 may be integrally formed with each other.

The first buffer 633 and the second buffer 634 may serve to attenuate an impact applied to the display module 610b or the window 610a. The first buffer 633 and the second buffer 634 may prevent dust particles from being introduced into a space between the display module 610b and the window 610a.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body;
   a case defining an appearance of the terminal body;
   a display module located at the terminal body;
   a window located at the display module; and
   a fixing unit having a first fixing portion configured to couple the display module to the window and a second fixing portion configured to couple the terminal body to the display module, the first fixing portion and the second fixing portion being integrally formed with each other, and the first fixing portion and the second fixing portion being partitioned from each other in a bending manner when the fixing unit is coupled to the display module,
wherein the display module includes:
  a liquid crystal display (LCD) module; and
  a housing configured to cover an outer circumference of the LCD module, the housing including a first contact surface contacting the first fixing portion and a second contact surface contacting the second fixing portion,
wherein the window is coupled to the first fixing portion, the case is coupled to the second fixing portion and the second fixing portion further extends to a lower surface of the display module such that the display module, and the window and the housing are integrally coupled to each other by the fixing unit, and
wherein the fixing unit includes:
  a middle member formed of synthetic resin;
  a first adhesive layer located at a surface of the middle member; and
  a second adhesive layer located at another surface of the middle member.

2. The mobile terminal of claim 1, wherein the terminal body includes a mounting portion recessed from one surface thereof, and
  wherein the display module is mounted in the mounting portion.

3. The mobile terminal of claim 2, wherein the case forms one side surface of the mounting portion, and
  wherein the fixing unit is configured to couple the display module to said one side surface of the mounting portion.

4. The mobile terminal of claim 1, further comprising a buffer on an upper surface of the first fixing portion, the buffer being configured to elastically support the window.

5. The mobile terminal of claim 1, wherein the first fixing portion includes a buffering member having two surfaces onto which an adhesive has been applied.

* * * * *